United States Patent
Sturm

[19]

[11] Patent Number: 6,116,108

[45] Date of Patent: Sep. 12, 2000

[54] ROUGHENED RING GEAR BEARING SURFACE

[75] Inventor: Gary Lee Sturm, Fort Wayne, Ind.

[73] Assignee: Dana Corporation, Toledo, Ohio

[21] Appl. No.: 09/190,817

[22] Filed: Nov. 12, 1998

[51] Int. Cl.[7] .................................................. F16H 55/12
[52] U.S. Cl. ............................... 74/447; 29/525; 403/345
[58] Field of Search ........................... 74/447, 446, 439, 74/434; 29/525; 403/345

[56] References Cited

U.S. PATENT DOCUMENTS

| | | | |
|---|---|---|---|
| 4,628,753 | 12/1986 | Heine et al. | 74/447 |
| 4,688,962 | 8/1987 | Koltookian . | |
| 5,289,733 | 3/1994 | Kallenberger | 74/447 |
| 5,320,587 | 6/1994 | Bodtker et al. . | |
| 5,837,066 | 11/1998 | Linzell | 29/525 |
| 5,988,483 | 11/1999 | Linzell | 29/525 |

*Primary Examiner*—David M. Fenstermacher
*Attorney, Agent, or Firm*—Liniak, Berenato Longacre & White

[57] ABSTRACT

A connection for preventing relative movement between coupled members in a clamped joint. In particular, ring gear/differential housing members are connected across a roughened surface finish providing protrusions and allow positive load transfer without slippage. Different methods are proposed to achieve the roughening, or surface modification, of the backside of the ring gear surface, and this design provides increased frictional coefficients without adversely affecting performance of the differential assembly. The simplicity and low cost of this connection makes it particularly useful for a wide variety of these bolted assemblies.

10 Claims, 3 Drawing Sheets

ROUGHENED RING GEAR BEARING SURFACE

BACKGROUND OF THE INVENTION a) Field of the Invention

The present invention relates generally to an assembly and method for preventing slippage between load carrying members that are clamped together. More specifically, the invention relates to a surface finish modification that enhances the frictional characteristics of a ring gear back face that engages the flange face of the differential case.

b) Description of the Prior Art

There are many assemblies where torque or shear loads are transferred between two members and the members are joined to each other in a clamped or bolted connection. Such assemblies may be dynamic as in drive trains, or static as in frame elements. It is highly desirable that these connections eliminate any relative slippage between the parts under imposed shear or torsion loads.

The prior art has used several methods to eliminate slippage in bolted clamp connections. These methods include providing an increased number of, or greater nominal diameter for the bolts between the connection such that friction will transfer torsion or shear loads, providing interlocking mechanical means to transfer loads between the two elements, or applying anaerobic adhesives to increase the shear capacity of the joint and eliminate slippage. Adding additional bolts to the connections increases the cost and assembly time to make the connection. The mechanical interlocking means used in such assemblies includes large diameter dowels, matched assemblies and lapped joints. However, the use of interlocking means decreases the interchangeability of parts and again increases the expense of the connection. In addition, a certain amount of clearance is still associated with dowels and matched assemblies. This clearance allows free motion across the joint prior to engagement of the interlocking components. Anaerobic adhesives represent a relatively new approach to the problem of connection slippage, but suffer the drawbacks of low torsional resistance, reduced effectiveness at elevated temperatures, and high sensitivity to assembly cleanliness.

It is also known to connect two members by deforming a third compliant element disposed between the two members so that the deformed element will engage the two members and transfer loads therebetween. However, these prior art devices involve initial large-scale deformation of the compliant element across regularly machined surfaces. Accordingly, these methods are expensive to employ and suffer the cost disadvantage associated with the interlocking joints previously described.

The prior art also describes a ring gear assembly comprising a gasket or coupling member between a ring gear and differential case. However, this assembly suffers from an inherent drawback due to the high compressibility of the aluminum gasket and other materials utilized as the coupling gasket.

This invention differs from the prior art in several ways. No intermediate material is introduced into the scheme of the fastened joint. Inherent piece part prices and assembly costs are lowered. More explicitly, the use of a deformable intermediate member is not desired. Ring gear screws are short in length by design. Ring gear screws are quite rigid with little elastic elongation, or stretch, when tightened. Due to this rigidity, an extremely hard, unyielding interface between the ring gear back face and differential case flange is desired. Slight yielding of an intermediate material quickly reduces the effective total fastened length. This reduction in length greatly reduces total clamp load and similarly the installation torque of the ring gear screw. This invention will maintain a hard, fastened joint with little chance of yielding, or material creep.

The need exists for an enhanced frictional connection between a ring gear back face and the flange face of the cast iron differential case to overcome the drawbacks inherent in the prior art.

SUMMARY OF THE INVENTION

The object of the present invention is to provide a means to alter the coefficient of friction between the ring gear and the flange face of the differential case. In particular, the present invention provides a method and assembly for providing a surface finish modification to enhance the frictional characteristics of a ring gear back face engaging the flange face of the cast iron differential case.

The present invention proposes different methods to achieve the roughening, or surface modification, of the backside of the ring gear surface. A typical dynamic coefficient of friction between an oil ground ring gear face and differential case is about 0.09. Selection of a proper shot peen media or other suitable surface modification method can drive the coefficient of friction to around 0.20–0.30; this value corresponds to a surface finish of about 50–200 microinch arithmetic average. A surface finish or frictional coefficient well above this range will negatively impact the performance of the differential assembly.

For example, the present invention also proposes to chemically etch the backside of the ring gear to provide surface finish modification. Chemical etching can greatly alter a surface finish without significant loss of dimension on the gear thickness. Any thickness loss can be accounted for by monitoring the process. Additionally, alteration may be accomplished by mildly knurling the backside of the ring gear to alter the friction coefficient.

Other advantages, variations and embodiments of this invention will become apparent from the following detailed description.

DETAILED DESCRIPTION OF THE PREFERRED EMBODIMENTS

Figure 1:
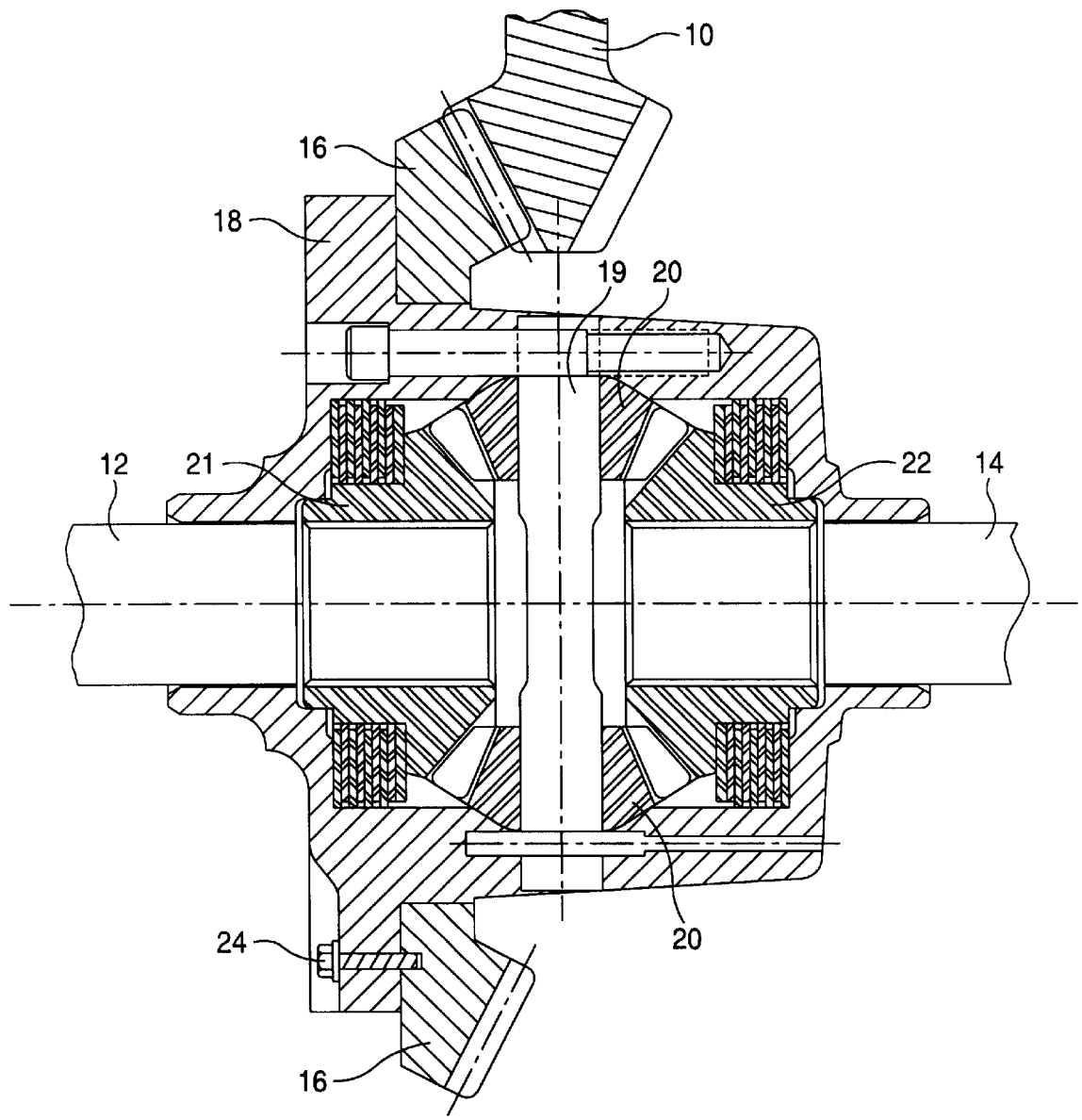
FIG. 1 depicts a section of a differential incorporating the connection of this invention.

FIG. 1 shows the differential portion of a vehicle drive train for transmitting torque from a drive pinion 10 to a pair of output shafts 12 and 14. Torque is transferred from pinion 10 to shafts 12 and 14 by ring gear 16, differential housing 18, differential pinions 20, rotatably supported by a shaft 19, and a pair of side gears 21 and 22. The connection of this invention is used to attach ring gear 16 to differential housing 18 by altering the frictional characteristic between the ring gear and housing. The ring gear is clamped to differential housing 18 by bolts 24 which pass through the differential housing 18 and ring gear 16.

Apart from the treatment of the engagement surface of the ring gear/housing interface, the differential is of a typical construction. Side gears 21 and 22 guide output shafts 12 and 14, respectively, and are, in turn, supported respectively by differential housing 18. Drive pinion 10, differential housing 18 and differential housing cover are supported, respectively, by an axle housing through bearing sets which have their outer races located in axle housing.

Figure 2:
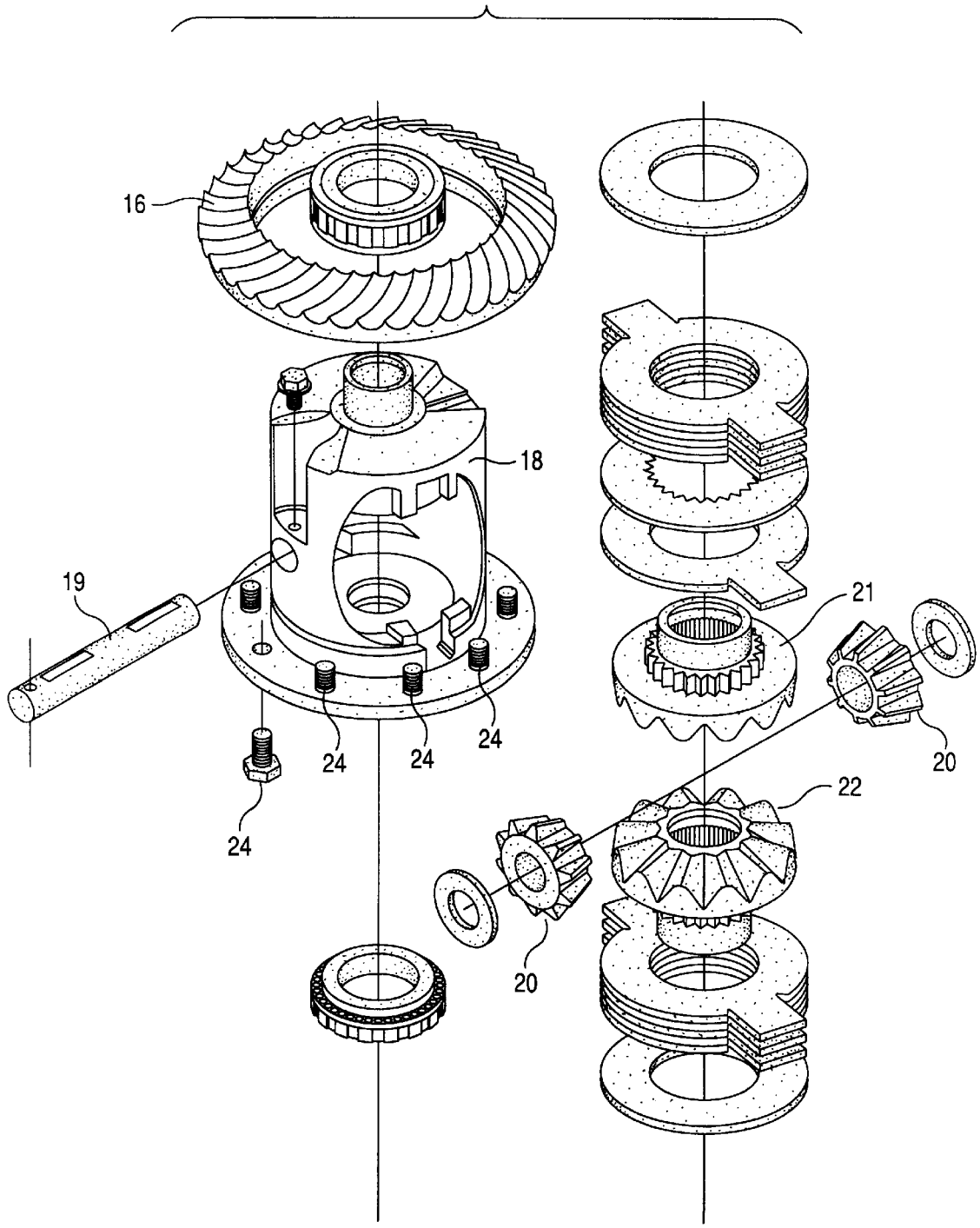
FIG. 2 is an exploded view of a differential incorporating the connection of this invention.

Typically, a ring gear is attached to the differential case by screws or bolts (see element 24 of FIGS. 1 and 2). This retention is performed by friction only, and not by any shear loading of the fasteners. The total clamp load of the bolt(s), the radius of the bolt circle, and the frictional characteristic of the ring gear-differential flange interface are the controlling factors of the torque that can carried by this fastened joint.

When one is experiencing ring gear screw fastener fatigue fractures due to low clamp load, one may increase the ring screw nominal thread size. The present invention provides the additional unique option of surface finish alteration to further increase the torque capability of this fastened connection. Packaging larger size fasteners can not always be done; thus more of the same size fasteners have to be added to increase the total clamp load. Both add greatly to the cost.

This invention concerns the modification of the surface finish of the backside of a ring gear that interfaces with a differential case flange. The torque capacity of this bolted interface has three determining factors for its capacity. These are the radius of the bolt circle, the total clamp load of the fasteners, and finally the coefficient of friction between the backside of the ring gear and the differential case machined flange.

Due to packaging restraints, the bolt circle often cannot be enlarged to improve performance and torque capability. Larger nominally sized bolts as well as a larger quantity of bolts may not be packaged easily. Both of these changes add considerable cost to the design. Numerous components, such as the differential case and ring gear, require associated modification, which adds to the total cost of the change. A less expensive means to accomplish an increase in torque capacity is economically desired.

Typically the backside of the ring gear is ground providing a smooth, flat surface. Combined with the exposed graphitic machined surface of the cast iron differential case flange, and their oily surfaces for rust prevention, the coefficient of friction may be under 0.10.

This invention pertains to the roughening, or frictional modification, of the backside of the ring gear to increase the coefficient two-or-three fold for enhanced performance of the fastened joint. If the coefficient of friction is modified from 0.10 to 0.20 the effective torque capacity of this bolted joint is doubled.

Three different unique means to accomplish this modification to the coefficient of friction of the backside of the ring gear surface are described within this invention. These means include shot peening, chemical etching, and mild mechanical knurling among others that may also be manufactured.

The surface of the hardened ring gear that engages the differential case will have its coefficient of friction modified by shot peening, chemical etching, or mild mechanical knurling. These processes will be performed in the "green" or unheat-treated state. Since the ring gear is the harder surface of the components, it has been selected for initial modification of its frictional characteristics. The coefficient of friction for the differential case flange may also be modified to further enhance the performance of this bolted joint.

The backside of the hardened ring gear is typically a ground surface. This ground surface lends itself to a low surface finish around 10–20 microinches. A flat surface is desired for alignment of the ring gear to the differential case flange to thereby provide proper meshing of the ring gear with the pinion gear.

Shot peening, chemical etching, and mild knurling offer negligible changes to this desired flatness. These methods have been initially selected as feasible methods to accomplish the desired increase in the coefficient of friction. These processes can be closely controlled to achieve the desired frictional effect. These methods also may be applied to the differential case flange. Other methods of surface finish modification may additionally be used without departing from the spirit of this invention.

Surface finish modification offers an increase in the torque carrying capacity of the differential case flange-to-ring gear fastened joint. This design maintains the hard surface contact that is required for this bolted joint. Introduction of a gasketed embodiment between these interfaces has the main flaw of allowing compression, or yielding, of the gasketed embodiment. This compression, or yielding, causes clamp load loss to occur. This yielding, or compression, degrades the function of this bolted joint and defeats the original purpose of the gasketed embodiment.

This invention offers enhancements to the frictional characters for increased torque load capability. It does not introduce the cost of additional components, or assembly costs. Many ring gears are presently shot peened today to enhance the fatigue characteristics of the gear teeth. This invention will use a similar shot peening operation as its first choice of methodology in enhancing the frictional characteristics of the backside of the ring gear.

The present invention proposes different methods to achieve the roughening, or surface modification, of the backside of the ring gear surface. A typical dynamic coefficient of friction between an oil ground ring gear face and differential case is about 0.09. Selection of a proper shot peening media can drive the coefficient of friction to around 0.20–0.30, which corresponds to an increased surface roughness between about 50–200 microinch arithmetic average surface roughness. If the surface roughness is increased well above this range, the backlash characteristics, torque transfer and noise levels, as well as the overall performance of the differential assembly, are adversely affected.

Alternatively, the present invention proposes to chemically etch the backside of the ring gear to provide surface finish modification. Chemical etching can greatly alter a surface finish without significant loss of dimension on the gear thickness. Any thickness loss can be accounted for by monitoring the process. Additionally, alteration may be accomplished by mildly knurling the backside of the ring gear to alter the friction coefficient.

The heat-treated ring gear has a hardness of around Rockwell "C" 55. The cast iron differential case, which is much softer in nature than the ring gear, is about 197–255 HBS. The present invention proposes to modify the harder member, which is the ring gear.

Looking then in more detail at the connection between the differential housing and the ring gear, the engagement surface finish between the differential housing and the ring gear in accordance with this invention has been modified to prevent slippage between these two elements.

Figure 3:
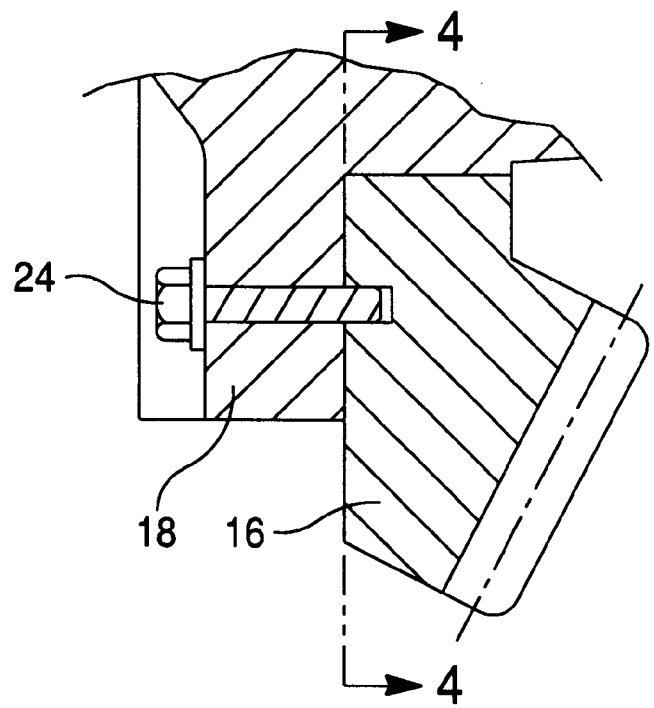
FIG. 3 enlarge section of the connection shown in FIG. 1.
Figure 4:
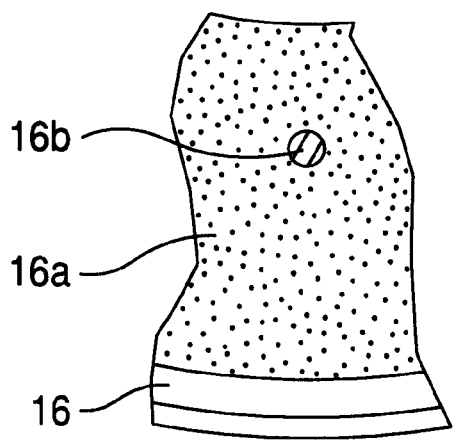
FIG 4 is a view of the modified surface of the ring gear shown in FIG. 1.

FIG. 3 is an enlarged section view of the connection between the ring gear 16 and the differential case 18, and FIG. 4 shows a partial plan view of a shot peened or otherwise treated surface 16a. Reference numeral 16b denotes one aperture provided in the ring gear 16 to receive a fastening bolt 24.

The ring gear surface modification of this invention frictionally locks the differential housing and the ring gear.

Those skilled in the art may also be aware of other assemblies where this invention may be particularly useful. Accordingly, the foregoing description is not meant to limit the scope of this invention or exclude the use of this invention in other applications or assemblies not specifically disclosed herein.

What is claimed is:

1. A gear assembly, comprising:
    a ring gear having a relatively flat face perpendicular to its axis of rotation, said face having a roughened surface with an increased coefficient of friction;
    a gear retaining member for receiving said ring gear, said retaining member having a relatively flat face opposite and parallel to said roughened surface of said ring gear; and
    a series of fasteners for clamping said roughened surface of said ring gear in direct contact with said face of said ring gear retaining member.

2. The gear assembly of claim 1, wherein said gear is either machined, shot peened, or knurled to produce said roughened surface having enhanced frictional characteristics.

3. The gear assembly of claim 2, wherein said gear is a ring gear for a differential, said gear retaining member is a differential housing.

4. The gear assembly of claim 3, wherein said ring gear is made of forged steel, and said differential case is made of cast iron.

5. The gear assembly of claim 1, wherein said coefficient of friction is above 0.2.

6. A method for transmitting transverse loads across and preventing relative sliding between two clamped together members, said method comprising:

providing a first relatively flat face on a first load carrying member parallel to the direction of the transverse loads;
   providing a second relatively flat face parallel to and facing said first face on a second load carrying member;
   roughening a surface of said first face to provide a roughened surface providing an increased coefficient of friction between said first and second faces thereby providing enhanced frictional characteristics; and
   clamping said first member to said second member across said roughened surface.

7. The method of claim 6, wherein said coefficient of friction is above 0.2.

8. The method of claim 6, wherein said step of roughening comprises one of chemical etching, shot peening, and knurling said surface of said first face to produce said roughened surface thereby providing said enhanced frictional characteristics.

9. The method of claim 6, wherein said first load carrying member is a ring gear, and said second load-carrying member is a differential case.

10. A gear assembly, comprising:
    a ring gear having a first substantially planar face perpendicular to an axis of rotation of said ring gear, said planar face having a roughened surface with an increased coefficient of friction;
    a differential case for receiving said ring gear, said differential case having a second substantially planar face opposite and parallel to said roughened surface of said ring gear; and
    a series of fasteners for clamping said roughened surface of said ring gear in direct contact with said face of said ring gear retaining member, said fasteners in conjunction with said roughened surface determining a clamping force between said ring gear and said differential case.

* * * * *